United States Patent Office 3,135,730
Patented June 2, 1964

3,135,730
COPPER COMPLEXES OF AZO-DYESTUFFS
Johannes Heyna, Frankfurt am Main, and Walter Noll, Bad Soden, Taunus, Germany, assignors to Farbwerke Hoechst Aktiengesellschaft vormals Meister Lucius & Brüning, Frankfurt am Main, Germany, a corporation of Germany
No Drawing. Filed Mar. 23, 1959, Ser. No. 800,934
Claims priority, application Germany Mar. 26, 1958
5 Claims. (Cl. 260—147)

The present invention relates to valuable new azo-dyestuffs containing metal and to a process of preparing the same; more particularly it relates to complex metal compounds of azo-dyestuffs corresponding to the following general formula $$F-A_n$$

wherein F represents an azo-dyestuff molecule containing a grouping capable of forming complex metal compounds and at least one group imparting solubility in water, A represents the group

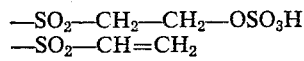
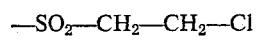

or

—SO₂—CH₂—CH₂—Cl and $n$ stands for the FIGURE 1 or 2.

We have found that valuable new metalliferous azo-dyestuffs are obtained by reacting an agent yielding metal with an azo-dyestuff containing a grouping capable of forming complex metal compounds and once or twice the group

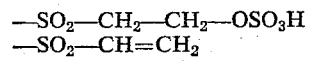

or

—SO₂—CH₂—CH₂—Cl and, furthermore, at least one group imparting solubility in water, such as the sulfonic acid or carboxylic acid group.

As azo-dyestuffs which are capable of forming complex metal compounds, there may be used, for instance, ortho, ortho'-dihydroxyazo-dyestuffs, ortho-hydroxy-ortho'-carboxy-azo-dyestuffs, ortho-hydroxy-ortho'-amino-azo-dyestuffs, ortho-hydroxy-ortho'-alkoxy-azo-dyestuffs which are transformed into ortho,ortho'-dihydroxyazo-dyestuffs during the formation of the metal salt, furthermore, ortho-hydroxy-ortho'-(ω-carboxymethoxy)-azo-dyestuffs and ortho-hydroxyazo-dyestuffs which are transformed into ortho,ortho'-dihydroxyazo-dyestuffs in the oxidizing metallization. As agents yielding metal there can be used compounds of copper, cobalt, chromium or nickel. These azo-dyestuffs can be converted into the metalliferous azo-dyestuffs preferably at a raised temperature in a neutral or in a weakly acid solution.

The metalliferous azo-dyestuffs obtainable by the present invention which contain the anionic sulfonic acid group in the side chain are of special importance. These dyestuffs possess a very good solubility in water and are, therefore, particularly suitable as printing dyestuffs which must be readily soluble in water.

The new dyestuffs can be used for dyeing and printing various fiber materials, especially cotton, viscose and staple fibers of regenerated cellulose. The dyeings and prints produced with the metalliferous azo-dyestuffs are distinguished by good to very good fastness to wet processing, since the vinylsulfone group which is formed in the dyeing operation or is already present is combined in an alkaline medium with the cellulose-containing fiber material.

The following examples serve to illustrate the invention but they are not intended to limit it thereto; the parts being by weight.

Example 1

221 parts of 2-aminophenol-4-β-hydroxyethylsulfone of 98% strength are introduced, while stirring, into 650 parts of sulfuric acid of 90% strength and stirred until a complete solution is obtained. The sulfuric acid solution is then poured into 1400 parts of ice and 270 parts of water and neutralized at 0–5° C. with a solution of 1150 parts of sodium hydroxide solution of 33% strength and 3450 parts of water while simultaneously adding 2700 parts of ice. The solution is then diazotized at 0–5° C. with 172.5 parts of a sodium nitrite solution of 40% strength and rendered neutral to delta paper with sodium bicarbonate.

510 parts of 1-(2'-chloro-6'-methyl-4'-sulfophenyl)-3-methyl-5-pyrazolone of 60% strength are stirred with 500 parts of water and then mixed with sodium hydroxide solution until a neutral reaction is attained. The diazo solution is then combined with the pyrazolone solution. The coupling is complete after a short time. The mixture is rendered neutral with acetic acid, 280 parts of crystallized sodium acetate and 250 parts of crystallized copper sulfate are added and the whole is heated to 60–65° C. The cupriferous dyestuff is salted out, filtered off with suction and dried. It is a brown powder and yields, when printed on cotton in the presence of sodium bicarbonate, a yellow print of good to very good fastness to wet processing and an excellent fastness to light. The dyestuff represents the complex copper compound of the following azo-dyestuff

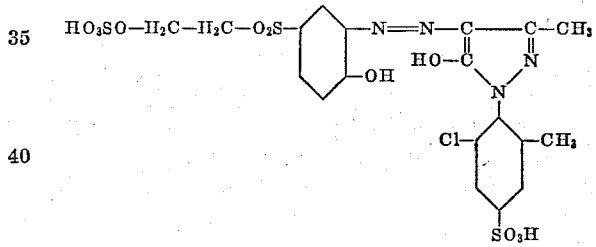

Example 2

221 parts of 2-aminophenol-4-β-hydroxyethylsulfone of 98% strength are introduced, while stirring, into 650 parts of sulfuric acid of 90% strength and stirred until a complete solution is obtained. The sulfuric acid solution is then poured onto 1400 parts of ice and 270 parts of water and neutralized at 0–5° C. with a solution of 1150 parts of sodium hydroxide solution of 33% strength and 3450 parts of water while simultaneously adding 2700 parts of ice. The solution is then diazotized at 0–5° C. with 172.5 parts of a sodium nitrite solution of 40% strength and rendered neutral to delta paper with sodium bicarbonate.

584 parts of 1-acetylamino-8-hydroxynaphthalene-3,6-disulfonic acid of 61% strength are dissolved in 2500 parts of water and combined with the diazo solution mentioned above. When the coupling is complete, the mixture is rendered acid to delta paper with acetic acid, 280 parts of crystallized sodium acetate and 261 parts of chrome alum are then introduced and the mixture is heated at 90–95° C. until the formation of the complex chromium compound is complete. The chromiferous dyestuff is salted out with 25% of potassium chloride, calculated on the volume of the liquid, filtered off with suction and dried. It is a dark blue powder which yields on cotton, in the presence of sodium bicarbonate, a navy blue dyeing of good to very good fastness to wet processing and a good to very good fastness to light. The dyestuff represents the complex chromium compound of the azo-dyestuff having the following constitution

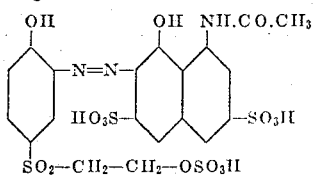

Example 3

221 parts of 2-aminophenol-4-β-hydroxyethylsulfone of 98% strength are introduced, while stirring, into 650 parts of sulfuric acid of 90% strength and stirred until a complete solution is obtained. The sulfuric acid solution is then poured onto 1400 parts of ice and 270 parts of water and neutralized at 0–5° C. with a solution of 1150 parts of sodium hydroxide solution of 33% strength and 3450 parts of water while simultaneously adding 2700 parts of ice. The solution is then diazotized at 0–5° C. with 172.5 parts of a sodium nitrite solution of 40% strength and rendered neutral to delta paper with sodium bicarbonate.

510 parts of 1-(2'-chloro-6'-methyl-4'-sulfophenyl)-3-methyl-5-pyrazolone of 60% strength are stirred with 500 parts of water and then mixed with sodium hydroxide solution until a neutral reaction is attained. The diazo solution is then combined with the pyrazolone solution. After a short time the coupling is complete. The mixture is rendered weakly acid with acetic acid. 280 parts of crystallized sodium acetate and 142 parts of cobalt sulfate are then introduced and the mixture is heated at 70–80° C. until the formation of the complex cobalt compound is complete. The dyestuff is then salted out with sodium chloride, filtered off with suction and dried. It is a brown powder and yields, when printed on cotton in the presence of sodium bicarbonate, a reddish yellow print of good to very good fastness to wet processing.

Example 4

296 parts of 2-amino-6-bromophenol-4-β-hydroxyethylsulfone are introduced while stirring into 650 parts of sulfuric acid of 90% strength and stirred until a complete solution is obtained. The sulfuric acid solution is then poured onto 1400 parts of ice and 270 parts of water and neutralized at 0–5° C. with a solution of 1150 parts of sodium hydroxide solution of 33% strength and 3450 parts of water while simultaneously adding 2700 parts of ice. The solution is then diazotized at 0–5° C. with 172.5 parts of a sodium nitrite solution of 40% strength and rendered neutral to delta paper with sodium bicarbonate.

394 parts of 1-amino-8-hydroxynaphthalene-3,6-disulfonic acid of 81% strength are dissolved in 2000 parts of water and 58 parts of sodium bicarbonate, and the diazo solution indicated above is combined at a temperature of 0–5° C. with the coupling solution. When the coupling is complete, the mixture is rendered weakly acid with acetic acid, 280 parts of crystallized sodium acetate are then introduced and at 60° C. 250 parts of crystallized copper sulfate are added thereto. The mixture is stirred at 60° C. until the formation of the complex copper compound is complete. The dyestuff is then salted out with potassium chloride, filtered off with suction and dried. It is a dark blue powder and dyes cotton in the presence of sodium carbonate blue tints of good to very good fastness to wet processing.

Example 5

32 parts of 2-amino-1-methoxybenzene-4-β-hydroxyethylsulfone sulfuric acid ester are introduced into 400 parts of ice water, 11 parts of hydrochloric acid (specific gravity=1.19) are added and the solution is diazotized at 0–5° C. with 17.3 parts of a sodium nitrite solution of 40% strength. The diazo solution is then neutralized with sodium bicarbonate until neutral to delta paper, and introduced into a solution of 58.4 parts of 1-acetyl-amino-8-hyroxynaphthalene-3,6-disulfonic acid of 61% strength in 250 parts of water. When the coupling is complete, 40 parts of crystallized sodium acetate, 26 parts of crystallized copper sulfate and 25 parts of acetic acid of 50% strength are added, and the mixture is heated at 90–95° C. until the formation of the complex copper compound is complete. The dyestuff is salted out with sodium chloride, filtered off with suction and dried. It is a dark red powder which dyes cotton in the presence of sodium carbonate red violet tints of good to very good fastness to wet processing, good fastness to chlorine and very good fastness to light.

Example 6

221 parts of 2-aminophenol-4-β-hydroxyethylsulfone of 98% strength are dissolved at 30° C. in 670 parts of concentrated sulfuric acid. This solution is stirred into 2100 parts of ice and neutralized at 0–5° C. with 2540 parts of a sodium hydroxide solution of 16.5% strength while adding 3500 parts of ice. The solution is then diazotized with 174 parts of a sodium nitrite solution of 40% strength. The nitrite in excess is removed with amidosulfonic acid. A solution of 581 parts of 2-hydroxynaphthalene-3,6-disulfonic acid in 4000 parts of water is then added and the whole is rendered weakly alkaline to delta paper with 60 parts of sodium carbonate. The coupling is completed at 35° C. The coupling mixture is rendered acid to delta paper with 50 parts of glacial acetic acid and 250 parts of crystallized sodium acetate are then added. After heating to 60° C., a solution of 285 parts of crystallized nickel sulfate in 700 parts of water is added and the whole is stirred at 60° C. until the complex nickel compound is formed. The dyestuff is separated with 25% of sodium chloride and 5% of potassium chloride. It is a brown-red powder which yields red prints on cotton.

The following table indicates a number of further metalliferous azo-dyestuffs which can be obtained by this invention, and also the tints of these azo-dyestuffs on cotton fibers, which likewise possess good properties of fastness.

|    | Diazo component | Coupling component | Metal | Tint |
|----|-----------------|--------------------|-------|------|
| 1  | 2-aminophenol-4-β-hydroxyethylsulfone sulfuric acid ester. | 1-hydroxynaphthalene-4,7-disulfonic acid. | Cu | Red. |
| 2  | ------do------ | 2-hydroxynaphthalene-3,6-disulfonic acid. | Cu | Do. |
| 3  | ------do------ | ------do------ | Ni | Do. |
| 4  | ------do------ | 1-chloroacetylamino-8-hydroxynaphthalene-3,6-disulfonic acid. | Cu | Violet. |
| 5  | ------do------ | 2-chloroacetylamino-8-hydroxynaphthalene-6-sulfonic acid. | Cu | Claret. |
| 6  | ------do------ | 1-benzoylamino-8-hydroxynaphthalene-3,6-disulfonic acid. | Cu | Red violet. |
| 7  | ------do------ | 1-(3'-β-chloroethylsulfonyl)-benzoylamino-8-hydroxynaphthalene-3,6-disulfonic acid. | Cu | Do. |
| 8  | ------do------ | 1-acetylamino-8-hydroxynaphthalene-3,6-disulfonic acid. | Ni | Claret. |
| 9  | ------do------ | ------do------ | Co | Violet. |
| 10 | ------do------ | ------do------ | Cr | Blue. |
| 11 | ------do------ | 2-acetylamino-5-hydroxynaphthalene-7-sulfonic acid. | Cu | Red. |
| 12 | ------do------ | 1-amino-8-hydroxynaphthalene-4-sulfonic acid. | Cu | Blue. |
| 13 | ------do------ | 1-amino-8-hydroxynaphthalene-3,6-disulfonic acid. | Cu | Navy blue. |
| 14 | ------do------ | ------do------ | Co | Blue. |
| 15 | ------do------ | ------do------ | Ni | Violet. |
| 16 | ------do------ | ------do------ | Cr | Green-blue. |
| 17 | ------do------ | 1-amino-8-hydroxynaphthalene-2,4-disulfonic acid. | Cu | Navy blue. |

| | Diazo component | Coupling component | Metal | Tint |
|---|---|---|---|---|
| 18 | 2-aminophenol-4-β-hydroxyethylsulfone sulfuric acid ester. | 1-amino-8-hydroxynaphthalene-4,6-disulfonic acid. | Cu | Violet. |
| 19 | ....do.... | 1-amino-8-hydroxynaphthalene-3,5-disulfonic acid. | Cu | Olive brown. |
| 20 | ....do.... | 2-N-phenylsulfonyl-N-methyl-8-hydroxynaphthalene-6-sulfonic acid. | Cu | Red. |
| 21 | ....do.... | 1-acetylamino-8-hydroxynaphthalene-4,6-disulfonic acid. | Cu | Blue red. |
| 22 | ....do.... | 1-phenylamino-8-hydroxynaphthalene-3,6-disulfonic acid. | Cu | Blue. |
| 23 | ....do.... | ....do.... | Cr | Green. |
| 24 | 2-aminophenol-4-sulfonic acid. | 1-(3'-β-chloroethylsulfonyl)-benzoylamino-8-hydroxy-naphthalene-3,6-disulfonic acid. | Cu | Red violet. |
| 25 | 2-amino-6-nitrophenol-4-β-hydroxyethylsulfone sulfuric acid ester. | 1-amino-8-hydroxynaphthalene-3,6-disulfonic acid. | Cu | Blue. |
| 26 | ....do.... | ....do.... | Ni | Blue. |
| 27 | ....do.... | ....do.... | Co | Green. |
| 28 | ....do.... | ....do.... | Cr | Do. |
| 29 | ....do.... | 1-amino-8-hydroxynaphthalene-4-sulfonic acid. | Cu | Do. |
| 30 | ....do.... | 1-amino-8-hydroxynaphthalene-2,4-disulfonic acid. | Cu | Brown. |
| 31 | ....do.... | 1-amino-8-hydroxynaphthalene-3,5-disulfonic acid. | Cu | Olive brown. |
| 32 | ....do.... | 1-amino-8-hydroxynaphthalene-4,6-disulfonic acid. | Cu | Do. |
| 33 | ....do.... | 1-phenylamino-8-hydroxynaphthalene-3,6-disulfonic acid. | Cu | Green. |
| 34 | ....do.... | ....do.... | Cr | Do. |
| 35 | {1-aminobenzene-4-β-hydroxyethylsulfone sulfuric acid ester. / 2-aminophenol-4-β-hydroxyethylsulfone sulfuric acid ester.} | 1-amino-8-hydroxynaphthalene-3,6-disulfonic acid. | Cu | Blue. |
| 36 | {1-aminobenzene-2-sulfonic acid. / 2-aminophenol-4-β-hydroxyethylsulfone sulfuric acid ester.} | ....do.... | Cu | Do. |
| 37 | {2-aminoanisole-4-β-hydroxyethylsulfone sulfuric acid ester. / 2-aminophenol-4-β-hydroxyethylsulfone sulfuric acid ester.} | ....do.... | Cu | Do. |
| 38 | {1-amino-4-nitrobenzene. / 2-aminophenol-4β-hydroxyethylsulfone sulfuric acid ester.} | 1-amino-8-hydroxynaphthalene-3,6-disulfonic acid. | Cu | Do. |
| 39 | 2-aminophenol-4-β-hydroxyethylsulfone sulfuric acid ester. | 1-chloro-8-hydroxynaphthalene-3,6-disulfonic acid. | Cu | Red violet. |
| 40 | ....do.... | 1-ethoxy-8-hydroxynaphthalene-3,6-disulfonic acid. | Cu | Do. |
| 41 | ....do.... | 1-(2'-methyl-6'-chloro-4'-sulfophenyl)-3-methyl-5-pyrazolone. | Cr | Orange. |
| 42 | 2-amino-6-bromophenol-4-β-hydroxyethylsulfone sulfuric acid ester. | 1-amino-8-hydroxynapthalene-3,6-disulfonic acid. | Cu | Blue. |
| 43 | 2-aminophenol-5-β-hydroxyethylsulfone sulfuric acid ester. | 1-acetylamino-8-hydroxynaphthalene-3,6-disulfonic acid. | Cu | Violet. |
| 44 | ....do.... | 1-phenyl-3-carboxy-5-pyrazolone. | Cu | Yellow. |
| 45 | ....do.... | 1-hydroxynaphthalene-4-sulfonic acid. | Cu | Claret. |
| 46 | ....do.... | 1-amino-8-hydroxynaphthalene-3,6-disulfonic acid. | Cu | Blue. |
| 47 | {2-aminophenol-4-β-hydroxyethylsulfone sulfuric acid ester. / 1-aminobenzene-4-β-hydroxyethylsulfone sulfuric acid ester.} | 1,8-dihydroxynapthalene-3,6-disulfonic acid. | Cu | Do. |
| 48 | 2-amino-6-acetylaminophenol-4-β-hydroxyethylsulfone sulfuric acid ester. | 1-acetylamino-8-hydroxynaphthalene-3,6-disulfonic acid. | Cu | Claret. |
| 49 | 2-aminophenol-4-β-hydroxyethylsulfone sulfuric acid ester. | 1-acetoacetylamino-benzene-4-sulfonic acid. | Cu | Yellow. |
| 50 | ....do.... | 2-hydroxynaphthalene-7-sulfonic acid. | Cu | Red. |
| 51 | ....do.... | 2-hydroxynaphthalene-6-sulfonic acid. | Cr | Claret. |
| 52 | ....do.... | ....do.... | Cu | Red. |
| 53 | ....do.... | 2-hydroxynaphthalene-5-sulfonic acid. | Cu | Do. |
| 54 | ....do.... | 1-hydroxynaphthalene-3-sulfonic acid. | Cu | Do. |
| 55 | ....do.... | 1-hydroxynaphthalene-4-sulfonic acid. | Cu | Do. |
| 56 | ....do.... | 1-hydroxynaphthalene-5-sulfonic acid. | Cu | Do. |
| 57 | ....do.... | {1-amino-8-hydroxynaphthalene-3,6-disulfonic acid → / 1-hydroxynaphthalene-4-sulfonic acid.} | Cu | Black. |
| 58 | ....do.... | 2-hydroxy-6-sulfo-naphthalene-3-carboxylic acid. | Cu | Red brown. |
| 59 | 2-aminophenol-5-vinylsulfone. | 1-acetylamino-8-hydroxy-naphthalene-4,6-disulfonic acid. | Cu | Red violet. |
| 60 | 2-aminophenol-4-vinylsulfone. | 1-(2'-chloro-5'-sulfophenyl)-3-methyl-5-pyrazolone. | Cu | Yellow. |
| 61 | 2-amino-6-nitrophenol-4-β-hydroxyethylsulfone sulfuric acid ester. | 2-aminonaphthalene-6-sulfonic acid. | Co | Olive. |
| 62 | ....do.... | 2-aminonaphthalene-4,7-disulfonic acid. | Co | Olive green. |
| 63 | ....do.... | 1-hydroxynaphthalene-3,6,8-trisulfonic acid. | Cr | Grey. |
| 64 | ....do.... | 2-methylaminonaphthalene-7-sulfonic acid. | Co | Olive green. |
| 65 | ....do.... | {1-amino-8-hydroxynaphthalene-3,6-disulfonic acid → / 1-hydroxynaphthalene-4-sulfonic acid.} | Cu | Black. |
| 66 | 1-amino-2-hydroxynaphthalene-4-sulfonic acid. | 1-(4'-β-hydroxyethylsulfone sulfuric acid ester-phenyl)-3-methyl-5-pyrazolone. | Cu | Red. |
| 67 | 1-amino-2-hydroxy-5-methoxybenzene-4-β-hydroxyethylsulfone sulfuric acid ester. | 1-hydroxynaphthalene-5-sulfonic acid. | Cu | Bluish violet. |
| 68 | ....do.... | 2-hydroxynaphthalene-6-sulfonic acid. | Cu | Reddish violet. |
| 69 | ....do.... | 1-hydroxynaphthalene-3,6-disulfonic acid. | Cu | Violet. |
| 70 | ....do.... | 1-hydroxynaphthalene-4,8-disulfonic acid. | Cu | Bluish violet. |
| 71 | ....do.... | 1-(4'-sulfophenyl)-3-methyl-5-pyrazolone. | Cu | Red. |
| 72 | 1-amino-2-hydroxy-5-methyl-benzene-4-β-hydroxyethylsulfone sulfuric acid ester. | ....do.... | Cu | Do. |
| 73 | ....do.... | 1-(4'-β-hydroxyethylsulfone sulfuric acid ester-phenyl)-3-methyl-5-pyrazolone. | Cu | Do. |
| 74 | {2-aminophenol-4-β-hydroxyethylsulfone sulfuric acid ester. / 2-aminophenol-4-β-hydroxyethylsulfone sulfuric acid ester.} | {1-amino-8-hydroxynaphthalene-3,6-disulfonic acid → / 1,3-dihydroxybenzene.} | Cu | Brown. |

We claim:
1. A complex copper compound of an azo dyestuff having the formula

$$[\overset{OR}{R_1-N=N-R_2}]A_n$$

wherein:

R represents a member of the group consisting of —H and —CH$_3$;

R$_1$ represents the radical of a member of the group consisting of benzene, bromobenzene, lower alkylbenzene, lower alkoxybenzene, nitrobenzene, acetylaminobenzene, sulfobenzene, and sulfonaphthalene;

R$_2$ represents the radical of a coupling component of the group consisting of
 (a) 1-phenyl-5-pyrazolones substituted in the 3-position by a member of the group consisting of CH$_3$ and COOH,
 (b) 1-phenyl-3-methyl-5-pyrazolones substituted on the phenyl group by a member of the group consisting of Cl, CH$_3$, SO$_3$H and combinations thereof,
 (c) sulfo naphthalenes substituted by at least one substituent of the group consisting of hydroxyl, ethoxy, carboxy, chlorine, amino, acetylamino, chloroacetylamino, benzoylamino, phenylamino and N-phenyl-sulfonyl-N-methylamino groups,
 (d) an acetoacetylamino benzene sulfonic acid and
 (e) a dihydroxybenzene, A represents a member selected from the group consisting of —SO$_2$—CH$_2$—CH$_2$—OSO$_3$H and —SO$_2$CH=CH$_2$ $n$ means one of the numbers 1 and 2; and the group OR is in o-position to the azo-group, said compound containing at least one water-solubilizing group selected from the group consisting of sulfonic acid and carboxylic acid groups.

2. The complex copper compound of the azo-dyestuff having the formula

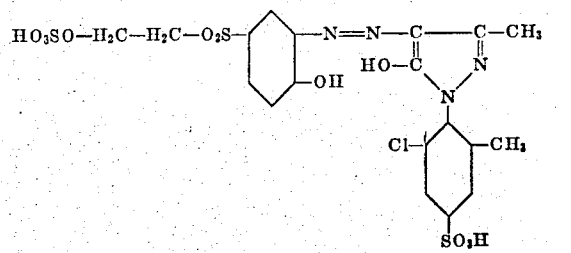

3. The complex copper compound of the azo-dyestuff having the formula

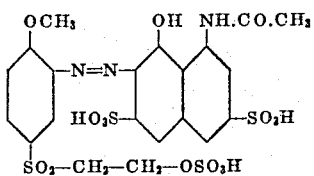

4. The complex copper compound of the azo-dyestuff having the formula

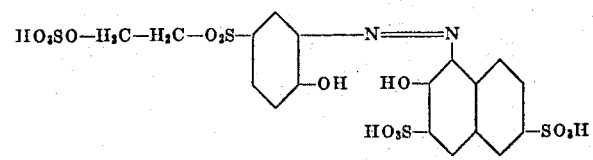

5. The complex copper compound of the azo-dyestuff having the formula

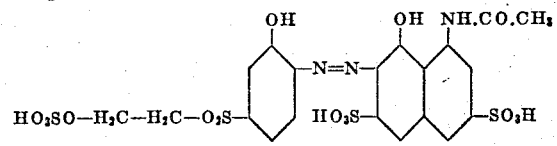

References Cited in the file of this patent
UNITED STATES PATENTS

| | | |
|---|---|---|
| 1,767,379 | Krzikalla et al. | June 24, 1930 |
| 2,657,205 | Heyna et al. | Oct. 27, 1953 |
| 2,728,762 | Heyna et al. | Dec. 27, 1955 |
| 2,738,345 | Schetty | Mar. 13, 1956 |
| 2,802,817 | Dittmar et al. | Aug. 13, 1957 |

FOREIGN PATENTS

| | | |
|---|---|---|
| 1,012,010 | Germany | July 11, 1957 |
| 327,283 | Switzerland | Mar. 15, 1958 |

OTHER REFERENCES

Guthrie: "American Dyestuff Reporter," January 7, 1952, pp. 13–14 and 30. (Available in Library.)